United States Patent [19]
Anderson

[11] Patent Number: 5,024,495
[45] Date of Patent: Jun. 18, 1991

[54] COMPUTER SOFTWARE PROTECTION, BY OPTICAL EFFECTS

[76] Inventor: David B. Anderson, 1600 Hartford St., Ann Arbor, Mich. 48103

[21] Appl. No.: 512,642
[22] Filed: Apr. 20, 1990
[51] Int. Cl.$^5$ ............................ G02B 5/32; G09C 1/04
[52] U.S. Cl. ....................................... 350/3.7; 380/54; 380/58
[58] Field of Search .................... 380/52, 54, 56, 57, 380/58, 59, 3, 4; 350/3.6, 3.7, 3.72, 3.81, 114, 115, 116, 321; 364/222.5

[56] References Cited

U.S. PATENT DOCUMENTS

| | | | |
|---|---|---|---|
| 3,166,625 | 1/1965 | Brumley | 380/54 |
| 3,178,993 | 4/1965 | Ferris et al. | 380/54 |
| 4,458,315 | 7/1984 | Uchenick | 364/200 |
| 4,562,306 | 12/1985 | Chou et al. | 178/22.08 |
| 4,584,641 | 4/1986 | Guglielmino | 364/200 |
| 4,593,353 | 6/1986 | Pickholtz | 364/200 |
| 4,785,361 | 11/1988 | Brotby | 360/60 |
| 4,858,036 | 8/1989 | Ginkel | 360/60 |

FOREIGN PATENT DOCUMENTS

WO86/00162  1/1986  PCT Int'l Appl. ..................... 380/3

OTHER PUBLICATIONS

Rao, S. Ananda and Pappu, S. V., "Holographic Methods for the Fabrication of Various Types of Mirrors", Rev. Sci. Instrum. 51(6), Jun. 1980, pp. 809-813.

Primary Examiner—Bruce Y. Arnold
Assistant Examiner—David R. Parsons

[57] ABSTRACT

This apparatus and method protects software from unauthorized distribution and use, by utilizing the fact that holograms and other optical effects-producing media are extremely difficult to copy. A hologram, series of holograms, or other optical media, are used to create an "optical software key". When queried by a computer program, the program user, with the help of the optical key, reads a code (or codes). When the appropriate code is input to the program, access (or continued access) is then allowed.

6 Claims, 3 Drawing Sheets

COMPUTER SOFTWARE PROTECTION, BY OPTICAL EFFECTS

BACKGROUND OF THE INVENTION

1. Field of Invention

This invention is directed to an apparatus and method to prevent software piracy.

2. Description of the Prior Art

Computer software, by it's very nature of storage, is vulnerable to piracy. Traditional methods of distributing software, via magnetic media, are easily copied and used by non-paying "customers". Many schemes have been devised to prevent software piracy. Some are admittedly better than others.

In one case the software is protected by encoding hidden data on normally unreadable tracks. In another, the software data contains a parasite program, and is rendered unusable without the proper parasite-killer program. Both of these methods may be defeated by one of many capable sets of utility programs. Once defeated, subsequent copies can easily be made without the need for special utility programs.

One commonly used method involves the use of tables of numbers/text, or pictures, printed in a color that is difficult to reproduce on a black-and-white copier. In order to access the program, the appropriate code or picture must be matched with the random one selected by the program. The problem here is that some black-and-white copiers, when set to their darkest setting, can still reproduce the color original as a readable black-and-white facsimile. Also a color copier will usually make a suitable copy. In addition, free-hand copies can be made, and although this may take some time, once done many hundreds of photo copies may result from this one effort.

Electronic devices that connect to an input/output port of a computer will provide excellent security, but have several drawbacks. One problem is that the cost is far too high to be used with any but the most expensive software packages. Another problem is that several of these devices may have to be connected to the same port, causing an unacceptable protrusion from the computer. Also, with multiple devices, the physical strain to the port connection and increased possibility of accidental damage due to the protrusion reduce the usefulness of this device.

One of the more useful and cost-effective means for copy-protecting magnetic media is the "bad-spot" technique. Intentional defects are placed throughout the magnetic media. The locations of these defects is encoded in the program, and must be present for program execution. Thus, when you copy the program to media without these defects, the program will not run. As with other methods, a set of utility programs can detect these defect locations, which can then be replicated on the new media. However, this needs to be done for each copy, which does help to prevent subsequent generation copies by users without such utility programs. The main problem with this method of protection is that a legitimate back-up copy cannot be made. And many software users want the convenience of running programs from a mass storage device such as a fixed disk, which this method doesn't allow for.

The method of software protection by the use of optical effects overcomes the aforementioned problems and allows flexibility for use and distribution of computer programs at a reasonable cost. The transfer of a program to a mass storage device or to a back-up media is now permitted and encouraged, since the program no longer bears the burden of copy-protection. An optical device, or optical "key", is now the copy-protected element. When the optical element is a hologram, it is inherently difficult to duplicate, especially in the case of a transmission hologram. The cost to reproduce the optical key is far below that of the electronic devices mentioned, but provides the same high level of security.

SUMMARY OF THE INVENTION

The intent of this invention is to insure that for every computer program in use at any moment in time, a software publisher has received appropriate compensation. To accomplish this, an optical key is provided with each program. The optical key provides a way to encode data that must be input to the computer upon request. Since the function of the optical key is extremely difficult to copy, the program itself may be freely copied or transferred to other media while only the copy that is accompanied by the optical key will run.

To implement the optical key, coded data is stored in the program which matches data obtained from the optical key. Upon verification of a proper match, the program continues to execute. The storage and verification techniques are easily employed by programmers who are practiced in the art. As software programming methods improve, the optical key will continue to provide increased levels of protection.

Although specific features of the invention may be shown in some drawings and not others, this is solely a matter of convenience, as each feature may be combined with any or all other features in accordance with the invention.

Figure 1:
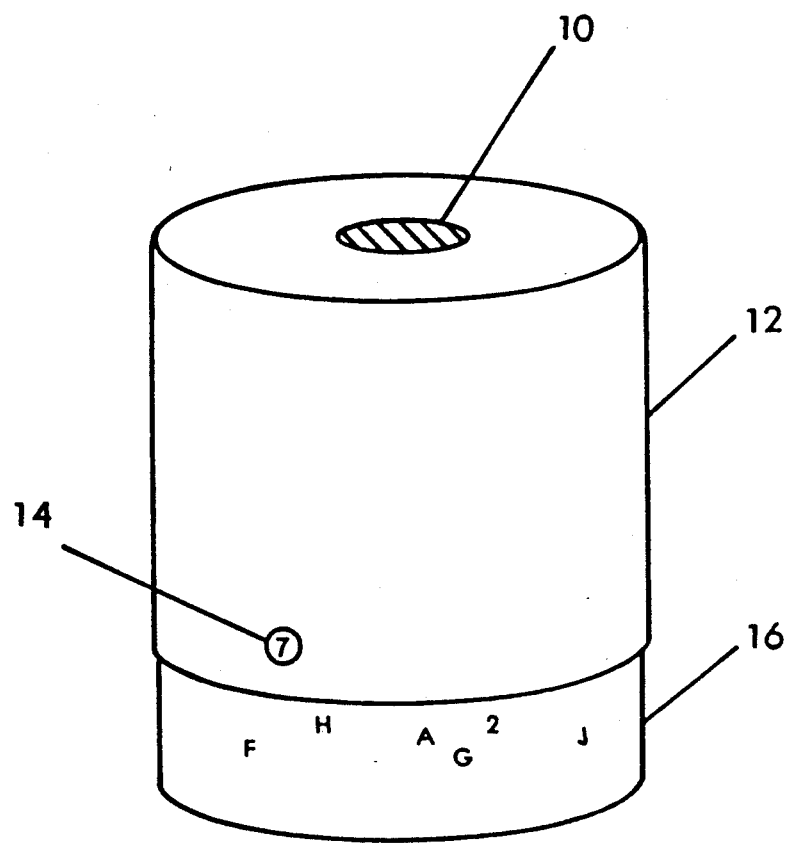
FIG. 1 is a perspective view of an assembled optical key of the present invention.
Figure 2:
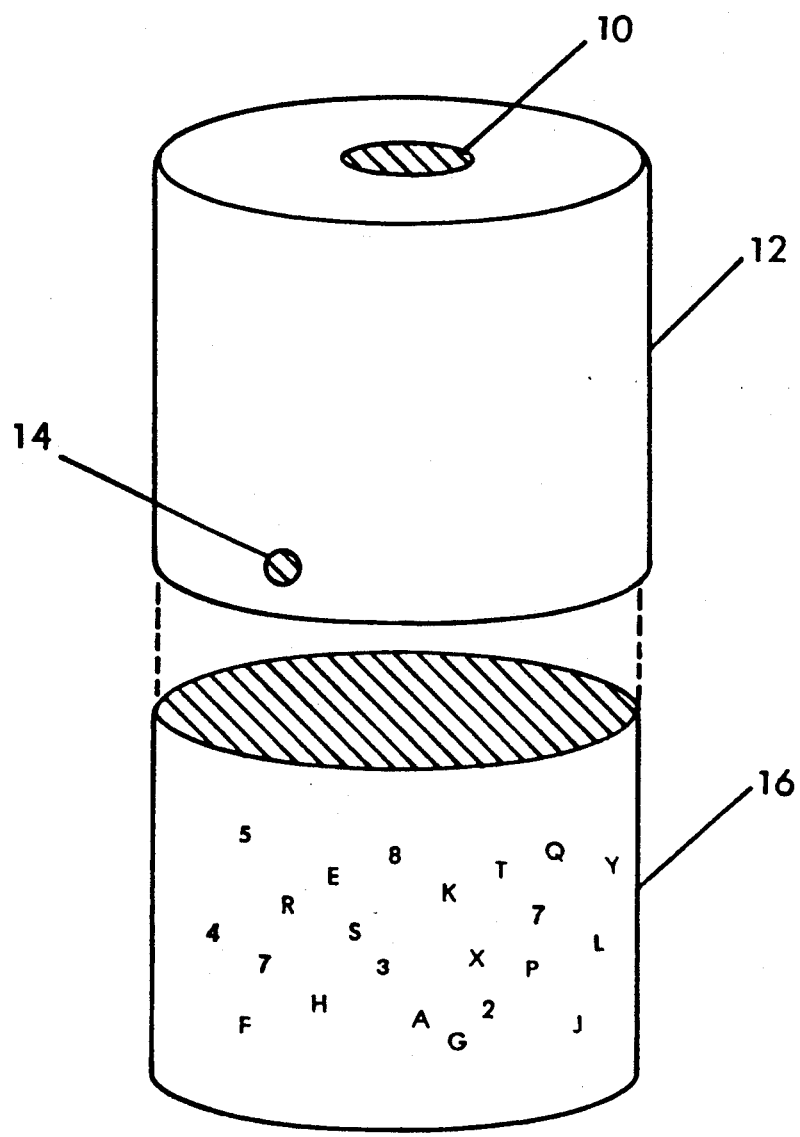
FIG. 2 is a perspective view of an optical element cylinder shown separated and above an encoded data cylinder of the optical key.

REFERENCE NUMERALS IN THE DRAWINGS 10 optical element
12 optical element cylinder
14 code window
16 code data cylinder
18 alignment transparency film
20 first display image segment
22 second display image segment
24A-D first order diffraction images

DESCRIPTION OF THE PREFERRED EMBODIMENTS

Many advantages, objects and features will occur from the following description of a preferred embodiment and drawings.

One of many possible embodiments is described as follows:

An optical key can be made by utilizing a holographic optical element, as available from Holosource, Inc., 21800 Melrose Ave., Suite 7, Southfield, Mich. 48075, phone # (313) 355-0412.

A cylinder 12 has one closed end holding an optical element 10 and one open end and has a code viewing window 14.

In the preferred embodiment, the an optical element 10 is a holographic optical element with a diffraction grating which causes multiple first order diffraction images 24A-D to surround each illuminated image 20, 22 as seen on a computer display.

The optical element 10 is mounted in such a way as to assure a constant relationship between the rotational angle of the diffraction grating of the optical element 10 and the code viewing window 14.

In the preferred embodiment, a code viewing window 14 through which a code may be viewed is located near the open end of the cylinder 12. Alternative viewing windows may be made from a slit, a square or rectangular window, or any unique size and shape of window or combination of windows, and may be placed anywhere on the cylinder.

A cylinder 16 has one closed end holding a transparency 18 and one open end, and has a seemingly random pattern of codes on its outer cylindrical surface that match a pattern imbedded in a software program. Cylinder 16 has a diameter smaller than cylinder 12 such that cylinder 16 fits inside and maintains contact with cylinder 12.

The transparency 18 has a marking on it large enough and of such a pattern as to obscure a similar pattern displayed by the computer display.

In the preferred embodiment, cylinders 12 and 16 are made from flexible impregnated or laminated fibrous material that can be repeatable bent without fracturing, as commonly used in flexible 3-ring binders. However, any other material may be used that is suited to construction of a cylinder, such as polyethylene, polypropylene, vinyl, nylon, rubber, leather, various plasticized materials, cardboard, paper, etc.

The combined measurement of three physical/optical properties are involved in verifying that a matching optical key is in the hands of the user. The three properties consist of:

1. the distance between the illuminated images 20 and 22.
2. the angular relationship between images 20 and 22, when referenced to the horizontal and vertical plane of the computer display.
3. the angle of diffraction of the optical element 10 in relation to the distance and angular relationship of the first order diffraction images 24A-D to the illuminated images 20 and 22.

The first order diffraction images 24A-D can only be seen when the illuminated images 20 and 22 are viewed through the optical element 10.

Figure 4:
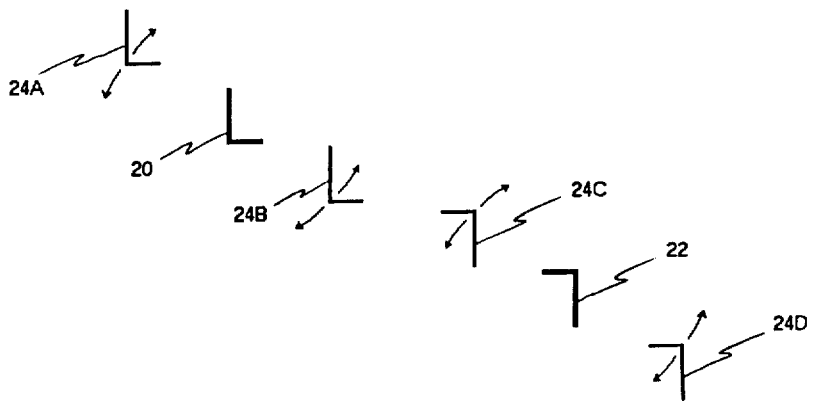
FIG. 4 shows a view of the computer display as seen through the optical key, with arrows indicating the direction of movement of the first order diffraction images in relation to the distance between the optical element and the computer display.

The rotational angular relationship of the first order diffraction images 24A-B to the illuminated images 20 and 22 will vary as the optical element 10 is rotated, as indicated by FIG. 4. This is accomplished by the rotation of cylinder 12.

Figure 5:
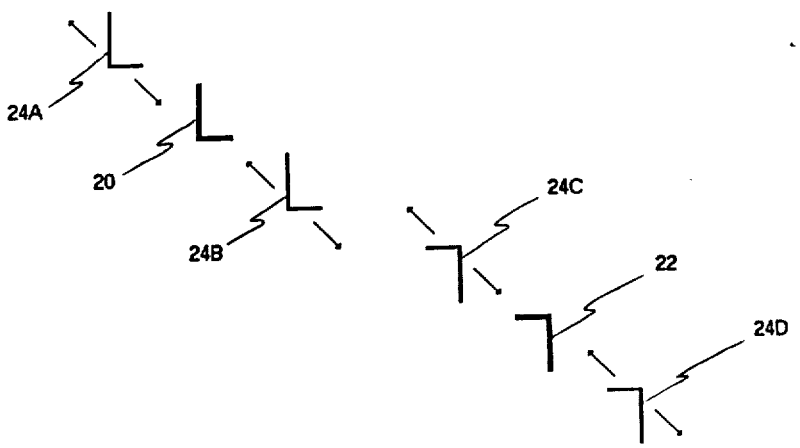
FIG. 5 shows a view of the computer display as seen through the optical key, with arrows indicating the direction of movement of the first order diffraction images in relation to the rotation of the optical element

The distance from the first order diffraction images 24A-B to the illuminated images 20, 22 as viewed through the optical element 10 will vary as the optical element 10 is moved closer to or further from the computer display, as seen in FIG. 5.

Figure 6:
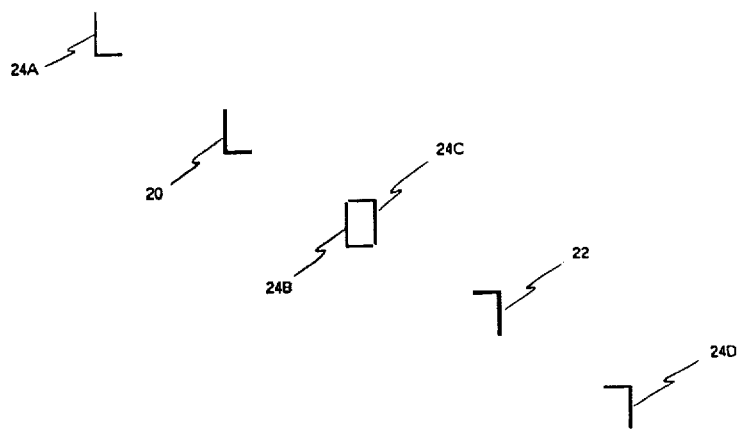
FIG. 6 shows a view of the computer display as seen through the optical key, as seen when the optical element has been aligned for both distance and rotation.

A typical session where the computer program requests verification of a matching optical key is as follows:

The computer program requests a code from the program user and displays illuminated images 20 and 22. The user takes the assembled optical key as shown in FIG. 1, and places the cylinder 16 against the computer display over the illuminated images. Looking through the optical element 10, the user sees the illuminated images. An alignment image may also be seen that matches the transparency markings. The cylinder 16 must be rotated or otherwise moved until the alignment image is obscured by the transparency markings. Now the cylinder 16 is properly aligned. Next, while holding cylinder 16 in place, cylinder 12 is rotated and placed closer to or further away from the computer display until the first order diffraction images 24-B and 24-C form the desired pattern, in this case a rectangle, as shown in FIG. 6. The optical key is now aligned, and a code can now be read in the view window 14. This code is input to the computer, usually via a keyboard or mouse, and the program continues to execute. If the wrong code is entered, program execution halts.

Each time the computer program requests a code from the user, the illuminated images appear at different distances and angular relationships relative to each other. This means the position of the optical element 10 must be different to achieve the proper alignment of the first order diffraction images 24-C and 24-D. And therefore the cylinder 12 and thus the view window 14 will be in a different position relative to cylinder 16. Thus the code seen through the window 14 is different each time. This requires the user to always have the optical key on hand when executing a protected program.

Other embodiments will occur to those skilled in the art and are within the following claims.

What is claimed is:

1. An optical key, comprising:
   a) an optical element to modify an image displayed by a computer display device.
   b) a first enclosure means in the form of a cylinder that holds said optical element parallel to said computer display device.
   c) an opening in said first enclosure means for viewing code data.
   c) a printed means for storing said code data.
   d) a second enclosure means in the form of a cylinder for holding said printed means.
   e) a first alignment means for alignment of said second enclosure means in relation to said computer display device.
   f) a second alignment means for alignment of said first enclosure means in relation to said second enclosure means and to said computer display device.

2. The optical key in claim 1 where said optical element is a holographic optical element.

3. The optical key in claim 1 where said first alignment means is a transparency with a printed pattern that obscures a similar image pattern displayed by said computer display device.

4. The optical key in claim 1 where said opening for viewing said code data is in said second enclosure means and where said printed means for viewing said code data is held by said first enclosure means.

5. The optical key in claim 1 where said printed means is the said first enclosure means.

6. The optical key in claim 1 where said printed means is the said second enclosure means.

* * * * *

UNITED STATES PATENT AND TRADEMARK OFFICE
CERTIFICATE OF CORRECTION

PATENT NO. : 5,024,495
DATED : June 18, 1991
INVENTOR(S) : David B. Anderson

Figure 3:
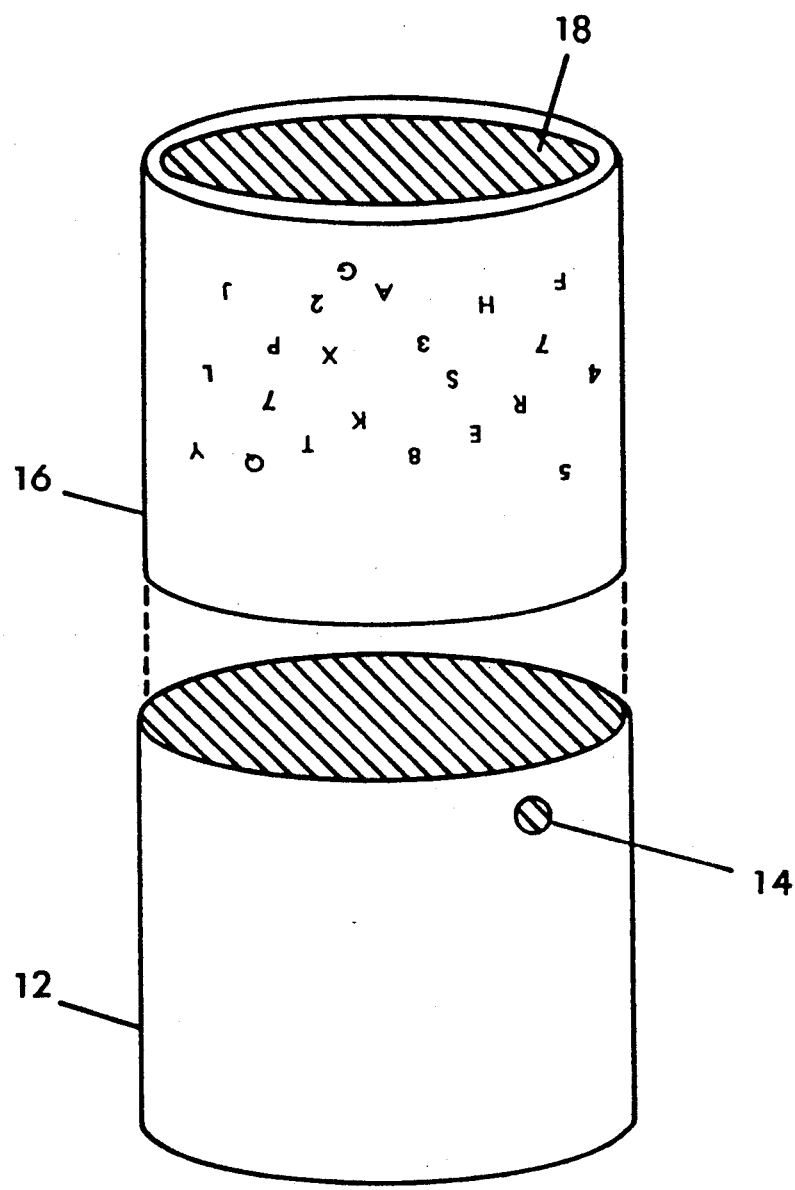
FIG. 3 is an inverted perspective view of the encoded data cylinder shown separated and above the optical element cylinder of the optical key.

It is certified that error appears in the above-identified patent and that said Letters Patent is hereby corrected as shown below:

Re-insert figures 4,5 and 6 (as originally submitted on drawing sheets #2 & 3) after figure 3, (per attached sheets).

Signed and Sealed this

Tenth Day of November, 1992

*Attest:*

DOUGLAS B. COMER

*Attesting Officer*     *Acting Commissioner of Patents and Trademarks*